United States Patent
Kobori

[15] 3,698,300
[45] Oct. 17, 1972

[54] ELECTRIC SHUTTER MECHANISM FOR A CAMERA
[72] Inventor: Toshio Kobori, Osaka, Japan
[73] Assignee: Minolta Camera Kabushiki Kaisha, Osaka, Japan
[22] Filed: Aug. 14, 1970
[21] Appl. No.: 63,777

[30] Foreign Application Priority Data
Aug. 18, 1969 Japan.....................44/78321

[52] U.S. Cl..............................95/10 CT, 95/53 EB
[51] Int. Cl..............................G01j 1/44
[58] Field of Search.....95/53 R, 53 E, 53 EA, 53 EB, 95/10 CE, 10 CT

[56] References Cited
UNITED STATES PATENTS
3,303,766  2/1967  Karikawa.................95/10 CT Primary Examiner—Samuel S. Matthews
Assistant Examiner—Monroe H. Hayes
Attorney—Watson, Cole, Grindle & Watson

[57] ABSTRACT

In an electric shutter mechanism for a camera the shutter is retained in a cocked position and held there by an operating member when exposure time setting is set for a bulb exposure so as to reduce the power consumed from the battery in maintaining energization of the circuitry normally retaining the shutter in a cocked position.

2 Claims, 3 Drawing Figures

INVENTOR
Toshio Kobori

AN ELECTRIC SHUTTER MECHANISM FOR A CAMERA

BACKGROUND OF THE INVENTION

In an electric shutter for controlling the opening and closing operation of a shutter by means of an electric delay circuit, in general the opening operation of the shutter is started by the release operation and simultaneously a power switch is closed to operate the electric delay circuit and a switching circuit. The switching circuit excites an electromagnet for restraining the starting of the shutter closing operation, and after the delay operation, the switching circuit is switched to de-energize the electromagnet and release the restraint of the shutter closing operation.

Therefore, for the duration from the shutter opening operation to the starting of the shutter closing operation, electric current is flowing through the electromagnetic coil, so that for conventional exposures the time interval is very short, and accordingly the power consumption is low. However, for a bulb exposure setting the time interval is remarkably long and accordingly the power consumption is high.

SUMMARY OF THE INVENTION

The present invention is characterized in that the setting of the bulb exposure the restraint of the shutter closing operation by electrification of the electromagnet is remarkably shortened by selecting the time constant element in the delay circuit. Additionally, the shutter closing operation is by the restraining member interlocked with the shutter release operation, and the release of the restraining member is effected by the shutter release operation.

The object of the present invention is to prevent the wasteful consumption of power from a battery source for bulb exposure settings.

DESCRIPTION OF THE PREFERRED EMBODIMENT

Figure 1:
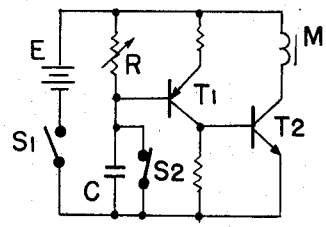
FIG. 1 is a circuit diagram of the electric control circuit for the electric shutter in an embodiment in accordance with the present invention.

FIG. 1 shows an electric control circuit for an electric shutter, wherein to electric power source E and main switch $S_1$, variable resistance R and condenser C are connected so as to form a time constant circuit, and by selecting the resistance the exposure time is optionally established.

Main switch $S_1$ is closed through the release operation directly before the shutter opening operation is started and closed when the release operation is finished. As main switch $S_1$ is closed transistor $T_1$ is made conductive and thereby transistor $T_2$ also is rendered conductive, and electromagnet M connected to the collector of transistor $T_2$ is excited. Electromagnet M attracts the shutter restraining lever to restrain the shutter closing operation.

The shutter is opened and simultaneously timing switch $S_2$ connected in parallel with condenser C, and ordinarily closed, is opened, and condenser C is charged by the current running through variable resistance R. The base voltage of transistor $T_1$ goes up gradually and when it reaches a certain voltage transistor $T_1$ is shut off, and thereby transistor $T_2$ also is shut off and accordingly the excitation current of electromagnet M is cut off to release the restraining of the shutter closing operation so that conventional exposure photography is effected.

Figure 2:
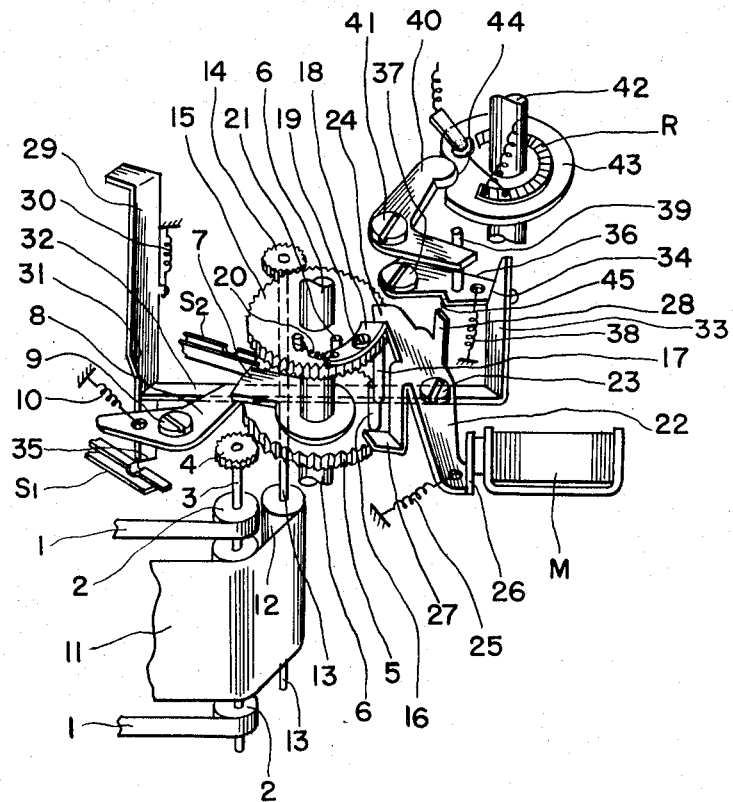
FIG. 2 is a perspective view of a mechanical embodiment in accordance with the present invention, showing the structure at the time when the shutter charge is finished.
Figure 3:
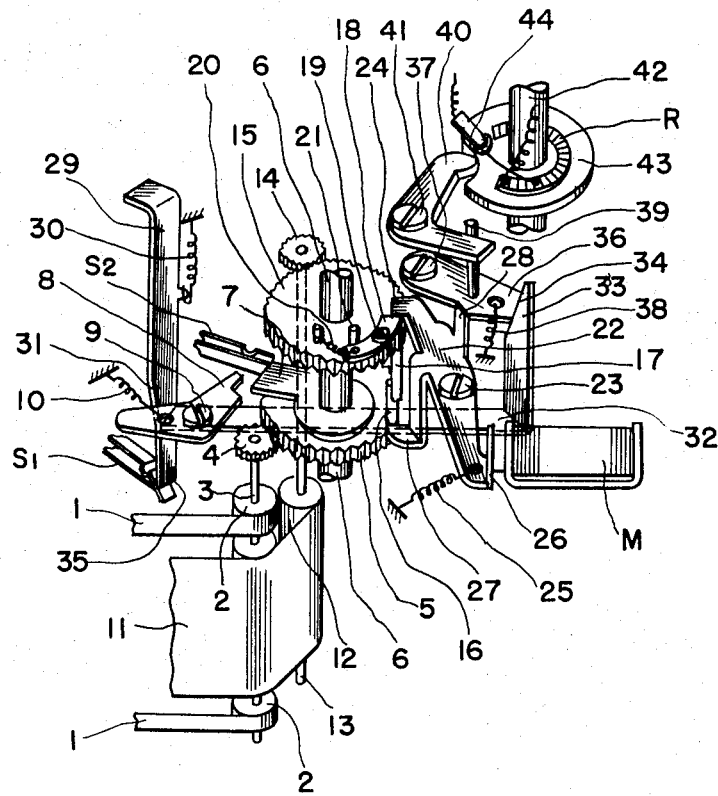
FIG. 3 is a perspective view showing the disposition of the mechanical structure immediately after the release operation is effected.

With reference to the focal plane shutter shown in FIG. 2 and FIG. 3 the mechanical construction for effecting the aforementioned operation will be described. Reference numeral 1 denotes an opening screen and 11 a closing screen. Winding axle 3 having reels 2, 2 for winding opening screen 1 meshes with opening screen gear 5 through gear 4, and opening screen restraining member 7 coaxial with axle 6 of opening screen gear 5 is engaged in the shutter charge situation shown in FIG. 2 with release lever 8 connected to axle 9 and having a clockwise turning tendency through spring 10. Thereby opening screen restraining member 7 holds timing switch $S_2$ closed. And, when the shutter charge is effected pin 16 projecting from opening screen gear 5 engages with pin 17 of closing screen gear 15 fitted loosely on axle 6 and meshed with gear 14 of closing screen winding axle 13 having reel 12 for winding closing screen 11, so as to turn closing screen gear 15 clockwise to wind closing screen 11 around its reel 12.

On the top face of closing screen gear 15 there is provided restraining member 18 pivoted rotatably by axle 19 and contacted with stop pin 21 by means of spring 20 which provides a clockwise turning tendency thereto. Closing screen restraining lever 22 which restraining pawl 24 on one end thereof engages with restraining member 18 is connected rotatably by axle 23 to the camera body and given a clockwise turning tendency by spring 25. On the other arm thereof with armature 26 facing the magnetic pole of electromagnet M is bent member 27 engaged with pin 16 of opening screen gear 5 to turn counter-clockwise against spring 25, so as to allow armature 26 to be in contact with the magnetic pole of electromagnet M. And, on closing screen restraining lever 22 restraining bent member 28 is formed.

Release rod 29 having an ascending tendency through spring 30 is provided on the side thereof with slope 31 for engaging with release lever 8, and on the lower end thereof there is formed protrusion 35 for engaging with main switch $S_1$, having an opening tendency, to close it. On the side thereof there is provided connecting member 32 with projecting deterrent member 33 having working slope 34.

Onto exposure time setting axle 42 change over cam 43 is fixed and on change over cam 43 there is formed indented portion 44 corresponding to a bulb exposure setting. On the upper surface of cam 43 there is formed a variable resistor corresponding to variable resistance R shown in FIG. 1. Change over lever 40 for engaging with the cam face of change over cam 43 is connected rotatably by axle 41 to the camera body.

Check lever 36 provided with pin 39 for engaging with the other arm of change over lever 40 is connected by axle 37 to the camera body and has a clockwise turning tendency by spring 38. As a result change over lever 40 tends to slide in contact with change over cam 43, and at the same time check lever 36 said working slope 34. Additionally, notch portion 45 of check lever 36 is formed so as to engage with or disengage from restraining bent member 28 of closing screen restraining lever 22 in response to the turning of check lever 36.

Since the present invention is formed as described above, in the conventional exposure on account of the turning of exposure time setting axle 42 the change over cam face, except indented portion 44, turns change lever 40 counter-clockwise, and change over lever 40 turns check lever 36, through engage pin 39, counter-clockwise against spring 38, so that lever 36 retreats from working slope 34 of deterrent member 33 and notch portion 45 thereof retreats from restraining bent member 28 of closing screen restraining lever 22.

And, by pushing down release rod 29 protrusion 35 thereof closes main switch $S_1$ and simultaneously slope 31 thereof turns release lever 8 counter-clockwise to release the restraining of opening screen restraining member 7, so that opening screen gear 5 starts to turn because opening screen 1 is pulled by the well known take-up spindle not shown in the drawings, thereby opening timing switch $S_2$ and at the same time initiating the opening of the shutter by opening screen 1. Thereupon, as described hereinbefore, just as electromagnet M is demagnetized by the electric control circuit, closing screen restraining lever 22 is turned clockwise by spring 25 and restraining pawl 24 thereof disengages from restraining member 18, and by being pulled by closing screen 11 closing screen gear 15 also turns counter-clockwise and the closing operation of the shutter is effected.

When exposure time setting axle 42 is set up for bulb exposure variable resistance R is set at a relatively low resistance (corresponding to 1/1000 second to 1/500 second) and change lever 40 engages in detent portion 44 of change over cam 43, therefore, check lever 36 also tends to turn clockwise but its turning is checked by working slope 34 of deterrent member 33 coupled with release rod 29 in its ascending position. Notch portion 45 thereof retracts from restraining bent member 28 as shown in FIG. 2. By pushing down release rod 29, first, main switch $S_1$ is closed and electromagnet M is excited to attract armature 26. In the engagement between restraining pawl 24 of closing screen restraining lever 22 and restraining member 18, as the descent of release rod 29 progresses slope 31 thereof turns release lever 8 as described above and the restraining of opening screen restraining member 7 is released. Further, as working slope 34 of deterrent member 33 descends check lever 36 turns clockwise to engage with restraining bent member 28 of closing screen restraining lever 22 which is locked with notch 45 of check lever 36, and thus closing screen restraining lever 22 is doubly locked as indicated in in FIG. 3.

Just as the restraining of opening screen restraining member 7 is released screen 1 starts to open and simultaneously timing switch $S_2$ is opened and the shutter opening operation is started. And as described hereinbefore, after a delay time of approximately 1/1000 second to 1/500 second, electromagnet M is demagnetized, however, as described hereinbefore closing screen restraining lever 22 is checked against turning by check lever 36 and the engagement between restraining pawl 24 and restraining member 18 is maintained. Accordingly, closing screen 11 is checked and the shutter is held open.

After the predetermined exposure is finished, and after the stopping of push down release rod 29, deterrent member 33 ascends together with release rod 29 and working slope 34 thereof turns check lever 36 counter-clockwise against spring 38 to retract notch 45 from restraining bent member 38, so that closing screen restraining lever 22 is turned clockwise by spring 25, restraining pawl 24 is disengaged from restraining member 18, closing screen 11 starts to travel, the shutter closing operation is effected, and thus bulb exposure is effected mechanically after the operation of the electric control circuit for a very short time.

In the present embodiment, release rod 29 and deterrent member 33 are connected directly by connecting member 32, however, deterrent member 33 can be connected to interlock with a well known reflector turning member or an auto-preset member operated by release rod 29 in a single lens reflex camera, so as to operate check lever 36 in connection with the release operation.

I claim:

1. An electric shutter mechanism for a camera, comprising:
   shutter opening means;
   manually operatable releasing means movable between a rest position and an operating position for actuating said shutter opening means;
   shutter closing means;
   retaining means for retaining said shutter closing member in a cocked position;
   means for holding said retaining means in a retaining position thereof;
   means for controlling the time interval during which said means for holding is energized;
   an exposure time setting member manually movable to a number of different exposure time settings including a bulb exposure position;
   an operating member engaging with said retaining member in response to shutter releasing operation for preventing said retaining member from retracting from said retaining position and being held in an engaging position with said releasing member in said operating position; and
   a control member for enabling said engagement of said operating member only with said setting member at said bulb exposure position.

2. An electric shutter mechanism as set forth in claim 1, wherein said means for controlling is set for short exposure time with said setting member at said bulb exposure position.

* * * * *